US012073324B2

(12) United States Patent
Wang et al.

(10) Patent No.: US 12,073,324 B2
(45) Date of Patent: Aug. 27, 2024

(54) SYSTEM AND METHOD FOR VEHICLE TAILLIGHT STATE RECOGNITION

(71) Applicant: TuSimple, Inc., San Diego, CA (US)

(72) Inventors: Panqu Wang, San Diego, CA (US); Tian Li, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 0 days.

(21) Appl. No.: 18/233,802

(22) Filed: Aug. 14, 2023

(65) Prior Publication Data
US 2023/0385637 A1 Nov. 30, 2023

Related U.S. Application Data

(63) Continuation of application No. 17/739,289, filed on May 9, 2022, now Pat. No. 11,734,563, which is a continuation of application No. 16/916,488, filed on Jun. 30, 2020, now Pat. No. 11,328,164, which is a continuation of application No. 16/542,770, filed on Aug. 16, 2019, now Pat. No. 10,733,465, which is a continuation-in-part of application No. 15/709,832, filed on Sep. 20, 2017, now Pat. No. 10,387,736.

(51) Int. Cl.
G06V 20/58 (2022.01)
G05D 1/00 (2006.01)
G06F 18/214 (2023.01)
G06N 3/04 (2023.01)
G06N 3/08 (2023.01)
G06V 10/44 (2022.01)
G06V 10/764 (2022.01)
G06V 10/82 (2022.01)
G06V 20/56 (2022.01)

(52) U.S. Cl.
CPC ............ G06N 3/08 (2013.01); G05D 1/0088 (2013.01); G05D 1/0246 (2013.01); G06F 18/214 (2023.01); G06N 3/04 (2013.01); G06V 10/454 (2022.01); G06V 10/764 (2022.01); G06V 10/82 (2022.01); G06V 20/56 (2022.01); G06V 20/584 (2022.01)

(58) Field of Classification Search
CPC ........ G06V 10/44; G06V 10/60; G06V 10/82; G06V 20/41; G06V 20/56; G06V 20/58; G06V 20/584; G06T 2207/20081; G06T 2207/20084; G06T 2207/30252; G06T 2207/30261; G06N 20/00; G05D 1/0231; G05D 1/0246
See application file for complete search history.

(56) References Cited

U.S. PATENT DOCUMENTS

| | | | |
|---|---|---|---|
| 6,777,904 B1 | 8/2004 | Degner et al. | |
| 7,103,460 B1 | 9/2006 | Breed | |
| 7,689,559 B2 | 3/2010 | Canright et al. | |
| 7,783,403 B2 | 8/2010 | Breed | |
| 7,844,595 B2 | 11/2010 | Canright et al. | |
| 8,041,111 B1 | 10/2011 | Wilensky | |
| 8,064,643 B2 | 11/2011 | Stein et al. | |
| 8,082,101 B2 | 12/2011 | Stein et al. | |
| 8,164,628 B2 | 4/2012 | Stein et al. | |
| 8,175,376 B2 | 5/2012 | Marchesotti et al. | |
| 8,271,871 B2 | 9/2012 | Marchesotti | |
| 8,378,851 B2 | 2/2013 | Stein et al. | |
| 8,392,117 B2 | 3/2013 | Dolgov et al. | |
| 8,401,292 B2 | 3/2013 | Park et al. | |
| 8,412,449 B2 | 4/2013 | Trepagnier et al. | |
| 8,478,072 B2 | 7/2013 | Aisaka et al. | |
| 8,553,088 B2 | 10/2013 | Stein et al. | |
| 8,788,134 B1 | 7/2014 | Litkouhi et al. | |
| 8,908,041 B2 | 12/2014 | Stein et al. | |
| 8,917,169 B2 | 12/2014 | Schofield et al. | |

(Continued)

FOREIGN PATENT DOCUMENTS

EP 2448251 A2 5/2012
EP 2463843 A2 6/2012

(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

(Continued)

Primary Examiner — Andrew W Johns
(74) Attorney, Agent, or Firm — Perkins Coie LLP

(57) ABSTRACT

A system and method for taillight signal recognition using a convolutional neural network is disclosed. An example embodiment includes: receiving a plurality of image frames from one or more image-generating devices of an autonomous vehicle; using a single-frame taillight illumination status annotation dataset and a single-frame taillight mask dataset to recognize a taillight illumination status of a proximate vehicle identified in an image frame of the plurality of image frames, the single-frame taillight illumination status annotation dataset including one or more taillight illumination status conditions of a right or left vehicle taillight signal, the single-frame taillight mask dataset including annotations to isolate a taillight region of a vehicle; and using a multi-frame taillight illumination status dataset to recognize a taillight illumination status of the proximate vehicle in multiple image frames of the plurality of image frames, the multiple image frames being in temporal succession.

20 Claims, 14 Drawing Sheets

(56) References Cited

U.S. PATENT DOCUMENTS

| | | |
|---|---|---|
| 8,963,913 B2 | 2/2015 | Baek |
| 8,965,621 B1 | 2/2015 | Urmson et al. |
| 8,977,007 B1 | 3/2015 | Ferguson et al. |
| 8,981,966 B2 | 3/2015 | Stein et al. |
| 8,993,951 B2 | 3/2015 | Schofield et al. |
| 9,002,632 B1 | 4/2015 | Emigh |
| 9,008,369 B2 | 4/2015 | Schofield et al. |
| 9,025,880 B2 | 5/2015 | Perazzi |
| 9,042,648 B2 | 5/2015 | Wang et al. |
| 9,111,444 B2 | 8/2015 | Kaganovich |
| 9,117,133 B2 | 8/2015 | Barnes et al. |
| 9,118,816 B2 | 8/2015 | Stein et al. |
| 9,120,485 B1 | 9/2015 | Dolgov |
| 9,122,954 B2 | 9/2015 | Srebnik et al. |
| 9,134,402 B2 | 9/2015 | Sebastian et al. |
| 9,145,116 B2 | 9/2015 | Clarke et al. |
| 9,147,255 B1 | 9/2015 | Zhang et al. |
| 9,156,473 B2 | 10/2015 | Clarke et al. |
| 9,176,006 B2 | 11/2015 | Stein |
| 9,179,072 B2 | 11/2015 | Stein et al. |
| 9,183,447 B1 | 11/2015 | Gdalyahu et al. |
| 9,185,360 B2 | 11/2015 | Stein et al. |
| 9,191,634 B2 | 11/2015 | Schofield et al. |
| 9,233,659 B2 | 1/2016 | Rosenbaum et al. |
| 9,233,688 B2 | 1/2016 | Clarke et al. |
| 9,248,832 B2 | 2/2016 | Huberman |
| 9,248,835 B2 | 2/2016 | Tanzmeister |
| 9,251,708 B2 | 2/2016 | Rosenbaum et al. |
| 9,277,132 B2 | 3/2016 | Berberian |
| 9,280,711 B2 | 3/2016 | Stein |
| 9,286,522 B2 | 3/2016 | Stein et al. |
| 9,297,641 B2 | 3/2016 | Stein |
| 9,299,004 B2 | 3/2016 | Lin et al. |
| 9,305,223 B1 | 4/2016 | Ogale et al. |
| 9,315,192 B1 | 4/2016 | Zhu et al. |
| 9,317,033 B2 | 4/2016 | Ibanez-Guzman et al. |
| 9,317,776 B1 | 4/2016 | Honda et al. |
| 9,330,334 B2 | 5/2016 | Lin et al. |
| 9,342,074 B2 | 5/2016 | Dolgov et al. |
| 9,355,635 B2 | 5/2016 | Gao et al. |
| 9,365,214 B2 | 6/2016 | Ben Shalom et al. |
| 9,399,397 B2 | 7/2016 | Mizutani et al. |
| 9,428,192 B2 | 8/2016 | Schofield et al. |
| 9,436,880 B2 | 9/2016 | Bos et al. |
| 9,438,878 B2 | 9/2016 | Niebla, Jr. et al. |
| 9,443,163 B2 | 9/2016 | Springer |
| 9,446,765 B2 | 9/2016 | Ben Shalom et al. |
| 9,459,515 B2 | 10/2016 | Stein |
| 9,466,006 B2 | 10/2016 | Duan |
| 9,476,970 B1 | 10/2016 | Fairfield et al. |
| 9,490,064 B2 | 11/2016 | Hirosawa et al. |
| 9,531,966 B2 | 12/2016 | Stein et al. |
| 9,535,423 B1 | 1/2017 | Debreczeni |
| 9,555,803 B2 | 1/2017 | Pawlicki et al. |
| 9,568,915 B1 | 2/2017 | Berntorp et al. |
| 9,587,952 B1 | 3/2017 | Slusar |
| 9,720,418 B2 | 8/2017 | Stenneth |
| 9,723,097 B2 | 8/2017 | Harris et al. |
| 9,723,099 B2 | 8/2017 | Chen et al. |
| 9,738,280 B2 | 8/2017 | Rayes |
| 9,746,550 B2 | 8/2017 | Nath et al. |
| 10,061,322 B1 | 8/2018 | Palefsky-Smith |
| 10,387,736 B2* | 8/2019 | Wang et al. ........... G06V 10/82 |
| 10,733,465 B2* | 8/2020 | Wang et al. ...... G06F 18/24143 |
| 11,328,164 B2* | 5/2022 | Wang et al. ............. G06N 3/04 |
| 11,734,563 B2* | 8/2023 | Wang et al. ........... G06N 3/045 |
| | | 382/103 |
| 2007/0230792 A1 | 10/2007 | Shashua et al. |
| 2008/0069400 A1 | 3/2008 | Zhu et al. |
| 2008/0249667 A1 | 10/2008 | Horvitz et al. |
| 2009/0040054 A1 | 2/2009 | Wang et al. |
| 2010/0049397 A1 | 2/2010 | Liu et al. |
| 2010/0226564 A1 | 9/2010 | Marchesotti et al. |
| 2010/0281361 A1 | 11/2010 | Marchesotti |
| 2011/0206282 A1 | 8/2011 | Aisaka et al. |
| 2012/0044066 A1 | 2/2012 | Mauderer et al. |
| 2012/0062746 A1 | 3/2012 | Otsuka et al. |
| 2012/0105639 A1 | 5/2012 | Stein |
| 2012/0140076 A1 | 6/2012 | Rosenbaum et al. |
| 2012/0274629 A1 | 11/2012 | Baek |
| 2013/0018547 A1 | 1/2013 | Ogata et al. |
| 2014/0145516 A1 | 5/2014 | Hirosawa et al. |
| 2014/0198184 A1 | 7/2014 | Stein et al. |
| 2014/0236449 A1 | 8/2014 | Horn |
| 2015/0062304 A1 | 3/2015 | Stein et al. |
| 2015/0353082 A1 | 12/2015 | Lee et al. |
| 2016/0037064 A1 | 2/2016 | Stein et al. |
| 2016/0094774 A1 | 3/2016 | Li et al. |
| 2016/0129907 A1 | 5/2016 | Kim et al. |
| 2016/0165157 A1 | 6/2016 | Stein et al. |
| 2016/0210528 A1 | 7/2016 | Duan |
| 2016/0321381 A1 | 11/2016 | English et al. |
| 2016/0375907 A1 | 12/2016 | Erban |
| 2018/0144202 A1 | 5/2018 | Moosaei et al. |
| 2019/0012551 A1 | 1/2019 | Fung et al. |
| 2019/0295292 A1 | 9/2019 | Oliva-Perez et al. |
| 2019/0333381 A1 | 10/2019 | Shalev-Shwartz et al. |

FOREIGN PATENT DOCUMENTS

| | | |
|---|---|---|
| EP | 2463843 A3 | 7/2013 |
| EP | 2761249 | 8/2014 |
| EP | 2463843 B1 | 7/2015 |
| EP | 2448251 A3 | 10/2015 |
| EP | 2946336 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 A1 | 10/2005 |
| WO | WO/2010/109419 A1 | 9/2010 |
| WO | WO2013045612 A1 | 4/2013 |
| WO | WO/2014/111814 A2 | 7/2014 |
| WO | WO/2014/111814 A3 | 7/2014 |
| WO | WO/2014/201324 A1 | 12/2014 |
| WO | WO2015/083009 A1 | 6/2015 |
| WO | WO2015/103159 A1 | 7/2015 |
| WO | WO2015/125022 A2 | 8/2015 |
| WO | WO2015125022 A3 | 8/2015 |
| WO | WO2015/186002 A2 | 12/2015 |
| WO | WO2015/186002 A3 | 12/2015 |
| WO | WO2016/135736 A3 | 9/2016 |
| WO | WO2016135736 A2 | 9/2016 |
| WO | WO2017/013875 A1 | 1/2017 |

OTHER PUBLICATIONS

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, pp. 1-4, Feb. 25, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, pp. 1-12, Nov. 8, 2016.

Li, Yanghao and Wang, Naiyan and Liu, Jiaying and Hou, Xiaodi, "Demystifying Neural Style Transfer", arXiv preprint arXiv:1701.01036, pp. 1-8, Jan. 4, 2017.

Hou, Xiaodi and Zhang, Liqing, "A Time-Dependent Model of Information Capacity of Visual Attention", International Confer-

(56) References Cited

OTHER PUBLICATIONS ence on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, pp. 1-10, Feb. 27, 2017.

Li, Yanghao and Wang, Naiyan and Liu, Jiaying and Hou, Xiaodi, "Factorized Bilinear Models for Image Recognition", arXiv preprint arXiv:1611.05709, pp. 1-9, Mov. 17, 2016.

Hou, Xiaodi, "Computational Modeling and Psychophysics in Low and Mid-Level Vision", California Institute of Technology, pp. i to xi and 1-114, May 7, 2014.

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010; Issue published: Oct. 1, 2010.

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, pp. 13-23, Jan. 1, 2001.

Kyoungho Ahn, Hesham Rakha, "The Effects of Route Choice Decisions on Vehicle Energy Consumption and Emissions", Virginia Tech Transportation Institute, Blacksburg, VA 24061, pp. 1-32, May 1, 2008.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV], pp. 1-8, Dec. 20, 2016.

Schroff, Florian, Dmitry Kalenichenko, James Philbin, (Google), "FaceNet: A Unified Embedding for Face Recognition and Clustering", pp. 1-10, CVPR Jun. 17, 2015.

Dai, Jifeng, Kaiming He, Jian Sun, (Microsoft Research), "Instance-aware Semantic Segmentation via Multi-task Network Cascades", pp. 1-10, CVPR Dec. 14, 2015.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO], pp. 1-7, Apr. 17, 2015.

Tian Li, "Proposal Free Instance Segmentation Based on Instance-aware Metric", Department of Computer Science, Cranberry-Lemon University, Pittsburgh, PA., pp. 1-2, 2015.

Mohammad Norouzi, David J. Fleet, Ruslan Salakhutdinov, "Hamming Distance Metric Learning", Departments of Computer Science and Statistics, University of Toronto, pp. 1-9, 2012.

Jain, Suyong Dutt, Grauman, Kristen, "Active Image Segmentation Propagation", In Proceedings of the IEEE Conference on Computer Vision and Pattern Recognition (CVPR), pp. 1-10, Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), pp. 1-8, 2014.

Kendall, Alex, Gal, Yarin, "What Uncertainties Do We Need in Bayesian Deep Learning for Computer Vision", arXiv:1703.04977v1 [cs.CV], pp. 1-11, Mar. 15, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, pp. 512-517, Jun. 21-24, 2010.

Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, pp. 1-9, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV], pp. 1-7, Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, pp. 1-16, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, pp. 298-312, Mar. 2007.

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, pp. 1-11, 2016.

Adhiraj Somani, Nan Ye, David Hsu, and Wee Sun Lee, "DESPOT: Online POMDP Planning with Regularization", Department of Computer Science, National University of Singapore, pp. 1-9, 2013.

Adam Paszke, Abhishek Chaurasia, Sangpil Kim, and Eugenio Culurciello. Enet: A deep neural network architecture for real-time semantic segmentation. CoRR, abs/1606.02147, pp. 1-10, 2016.

\* cited by examiner

SYSTEM AND METHOD FOR VEHICLE TAILLIGHT STATE RECOGNITION

PRIORITY PATENT APPLICATIONS

This patent document claims the benefit of U.S. patent application Ser. No. 17/739,289, filed on May 9, 2022, which claims the benefit of U.S. patent application Ser. No. 16/916,488, filed on Jun. 30, 2020, which claims the benefit of U.S. patent application Ser. No. 16/542,770, filed on Aug. 16, 2019, which claims the benefit of U.S. patent application Ser. No. 15/709,832, filed on Sep. 20, 2017, which are incorporated herein by reference in their entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2023, TuSimple, Inc., All Rights Reserved.

TECHNICAL FIELD

This patent document pertains generally to tools (systems, apparatus, methodologies, computer program products, etc.) for image processing, vehicle control systems, and autonomous driving systems, and more particularly, but not by way of limitation, to a system and method for detecting taillight signals of a vehicle.

BACKGROUND

For all motor vehicles operated on public roadways, taillight signals are a legally required item. The status of the taillight signals can help drivers understand an intention of another driver in a vehicle in front (a leading proximate vehicle). For an autonomous vehicle control system, it is crucial to identify the status of the taillight signals of a vehicle and thereby determine the intentions of the drivers of other leading vehicles. Additionally, there are limitations in the conventional camera systems in autonomous vehicles, which make it difficult for conventional autonomous vehicle control systems to recognize the status of the taillights of leading vehicles. Moreover, it is more complex for autonomous vehicle control systems to distinguish a taillight signal indicating a turning intention than a taillight signal indicating a braking condition. The diversity of vehicle types also poses many challenges, especially considering heavy-duty vehicles. Conventional autonomous vehicle control systems have been unable to implement a taillight recognition capability that replicates a human driver's ability to quickly and accurately recognize taillight signals in a variety of driving conditions. As a result, the safety and efficiency of autonomous vehicle control is being compromised by the inability of conventional systems to implement taillight recognition for determining the intentions of drivers of leading proximate vehicles.

SUMMARY

A system and method for detecting taillight signals of a vehicle are disclosed. Taillight recognition is the task of detecting vehicle taillight signals, including brake, turn, and emergency stop signals. In various example embodiments disclosed herein, a taillight signal recognition system is provided. An example embodiment can automatically detect taillight signals for all types of vehicles in real time and in all driving conditions. The example embodiment can use front-facing cameras mounted on the subject vehicle as input sensors. The example embodiments provide a system and method for automatically detecting taillight signals of a proximate leading vehicle, which includes receiving, at a computing device, a sequence of images from one or more cameras of a subject vehicle, generating a frame for each of the images, and labelling the images with one of three states of the taillight signals of proximate leading vehicles. The method further includes creating a first and a second dataset corresponding to the images and training a convolutional neural network to combine the first and second dataset. The method includes identifying a confidence level corresponding to statistics of temporal patterns of taillight signals, loading the confidence level to a calculating model, and refining parameters of the calculating model.

The taillight signal recognition system of the example embodiments can be implemented by generating datasets and machine learning models to recognize and act upon the taillight illumination status of proximate vehicles (e.g., vehicles near an autonomous vehicle). In particular, an example embodiment can be implemented by: 1) creating a trajectory level fully human-annotated dataset for taillight state recognition; 2) creating a deep learning based feature extractor for taillight mask feature extraction; and 3) creating a machine learning based model for accurate trajectory level taillight state recognition. In the disclosure herein, the term trajectory level refers to the capture and processing of taillight illumination status of proximate vehicles over multiple image frames in temporal succession as each proximate vehicle moves in its trajectory. The creation and use of these datasets and machine learning models for example embodiments are described in more detail below.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for detecting taillight signals of a vehicle are described herein. An example embodiment disclosed herein can be used in the context of an in-vehicle control system 150 in a vehicle ecosystem 101. In one example embodiment, an in-vehicle control system 150 with a taillight signal recognition module 200 resident in a vehicle 105 can be configured like the architecture and ecosystem 101 illustrated in FIG. 1. However, it will be apparent to those of ordinary skill in the art that the taillight signal recognition module 200 described and claimed herein can be implemented, configured, and used in a variety of other applications and systems as well.

Figure 1:
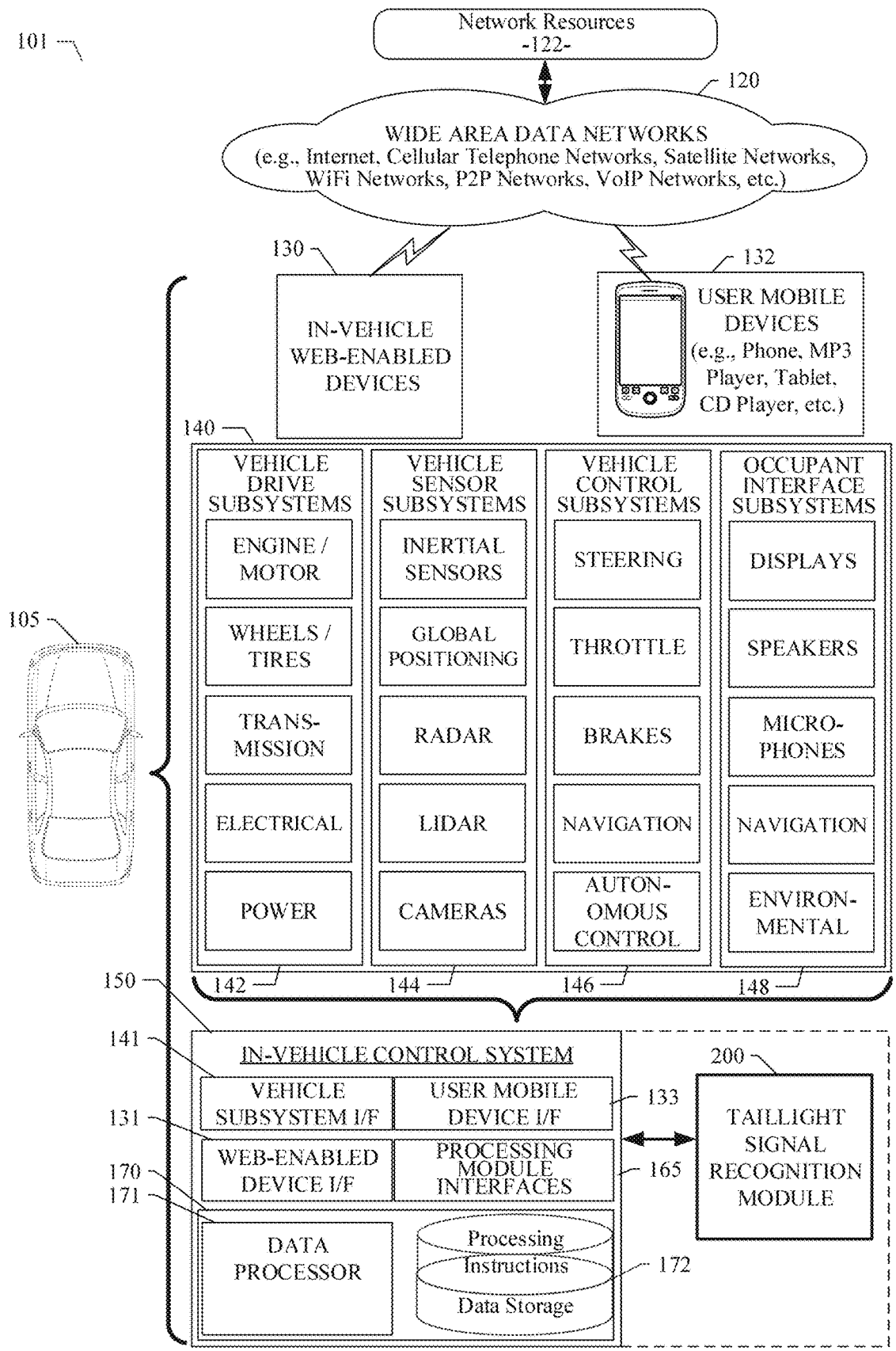
FIG. 1 illustrates a block diagram of an example ecosystem in which an in-vehicle taillight signal recognition system of an example embodiment can be implemented.

Referring now to FIG. 1, a block diagram illustrates an example ecosystem 101 in which an in-vehicle control system 150 and a taillight signal recognition module 200 of an example embodiment can be implemented. These components are described in more detail below.

Ecosystem 101 includes a variety of systems and components that can generate and/or deliver one or more sources of information/data and related services to the in-vehicle control system 150 and the taillight signal recognition module 200, which can be installed in the vehicle 105. For example, a camera (or other image-generating device) installed in the vehicle 105, as one of the devices of vehicle subsystems 140, can generate image and timing data that can be received by the in-vehicle control system 150. The in-vehicle control system 150 and the taillight signal recognition module 200 executing therein can receive this image and timing data input. As described in more detail below, the taillight signal recognition module 200 can process the image input and generate taillight signal status information, which can be used by an autonomous vehicle control subsystem, as another one of the subsystems of vehicle subsystems 140. The autonomous vehicle control subsystem, for example, can use the real-time generated taillight signal status information to safely and efficiently navigate and control the vehicle 105 through a real world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the taillight signal recognition module 200 for processing image data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the taillight signal recognition module 200. In various example embodiments, a plurality of processing modules, configured similarly to taillight signal recognition module 200, can be provided for execution by data processor 171. As shown by the dashed lines in FIG. 1, the taillight signal recognition module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing image input or image input analysis. Antennas can serve to connect the in-vehicle control system 150 and the taillight signal recognition module 200 with the data network 120 via cellular, satellite, radio, or other conventional signal reception mechanisms. Such cellular data networks are currently available (e.g., Verizon™ AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the taillight signal recognition module 200 can receive web-based data or content via an in-vehicle web-enabled device interface 131, which can be used to connect with the in-vehicle web-enabled device receiver 130 and network 120. In this manner, the in-vehicle control system 150 and the taillight signal recognition module 200 can support a variety of network-connectable in-vehicle devices and systems from within a vehicle 105.

As shown in FIG. 1, the in-vehicle control system 150 and the taillight signal recognition module 200 can also receive data, image processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the taillight signal recognition module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the taillight signal recognition module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the taillight signal recognition module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or other image-generating devices. The vehicle sensor subsystem 144 may also include sensors configured to monitor internal systems of the vehicle 105 (e.g., an 02 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the taillight signal recognition module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the taillight signal recognition module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touch-screen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by vehicle sensor subsystem 144 and the taillight signal recognition module 200, move in a controlled manner, or follow a path or trajectory based on output generated by the taillight signal recognition module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and taillight signal recognition module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the taillight signal recognition module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the taillight signal recognition module 200 can be implemented as in-vehicle components of vehicle 105. In various example embodiments, the in-vehicle control system 150 and the taillight signal recognition module 200 in data communication therewith can be implemented as integrated components or as separate components. In an example embodiment, the software components of the in-vehicle control system 150 and/or the taillight signal recognition module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Figure 2:
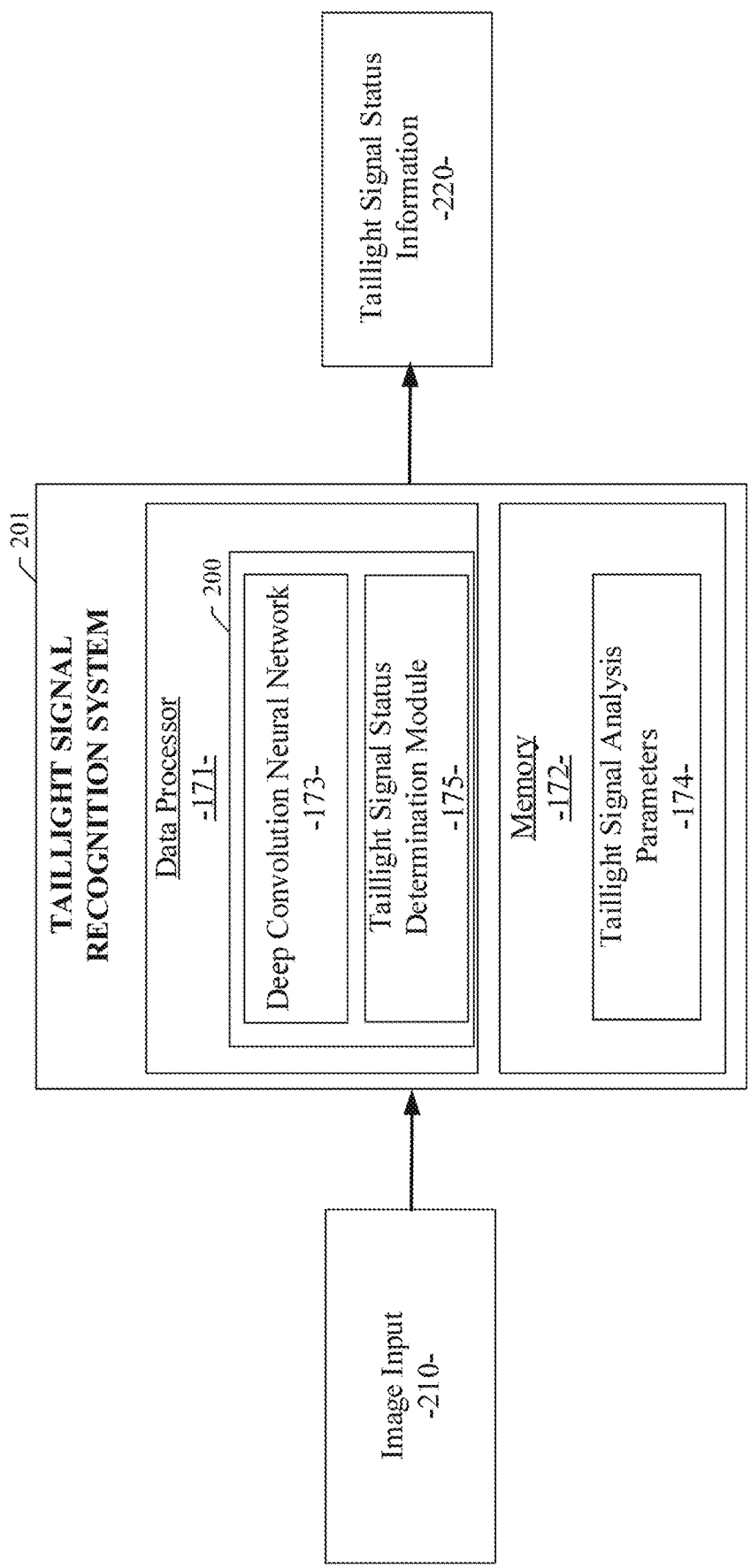
FIG. 2 illustrates the components of the taillight signal recognition system of an example embodiment.

Referring now to FIG. 2, a diagram illustrates the components of the taillight signal recognition system 201, with the taillight signal recognition module 200 therein, of an example embodiment. In the example embodiment, the taillight signal recognition module 200 can be configured to include a deep convolutional neural network 173 and a taillight signal status determination module 175. As described in more detail below, the deep convolutional neural network 173 and the taillight signal status determination module 175 serve to analyze one or more input images 210 received from one or more of the vehicle sensor subsystems 144, including one or more cameras, and determine the status of taillight signals corresponding to the images of proximate leading vehicles. The deep convolutional neural network 173 and taillight signal status determination module 175 can be configured as software modules executed by the data processor 171 of the in-vehicle control system 150. The modules 173 and 175 of the taillight signal recognition module 200 can receive the image input 210 and produce taillight signal status information 220 as described in more detail below. As a result, the autonomous control subsystem of the vehicle control subsystem 146 can more efficiently and safely control the vehicle 105. As part of their image processing, the deep convolutional neural network 173 and taillight signal status determination module 175 can be configured to work with taillight signal analysis parameters 174, which can be used to customize and fine tune the operation of the taillight signal recognition module 200. The taillight signal analysis parameters 174 can be stored in a memory 172 of the in-vehicle control system 150.

In the example embodiment, the taillight signal recognition module 200 can be configured to include an interface with the in-vehicle control system 150, as shown in FIG. 1, through which the taillight signal recognition module 200 can send and receive data as described herein. Additionally, the taillight signal recognition module 200 can be configured to include an interface with the in-vehicle control system 150 and/or other ecosystem 101 subsystems through which the taillight signal recognition module 200 can receive ancillary data from the various data sources described above. As described herein, the taillight signal recognition module 200 can also be implemented in systems and platforms that are not deployed in a vehicle and not necessarily used in or with a vehicle.

In an example embodiment as shown in FIG. 2, the taillight signal recognition module 200 can be configured to include the deep convolutional neural network 173 and taillight signal status determination module 175, as well as other processing modules not shown for clarity. Each of these modules can be implemented as software, firmware, or other logic components executing or activated within an executable environment of the taillight signal recognition system 201 operating within or in data communication with the in-vehicle control system 150. Each of these modules of an example embodiment is described in more detail below in connection with the figures provided herein.

Systems and Methods for Detecting Taillight Signals of a Vehicle

A system and method for detecting taillight signals of a vehicle are disclosed. In various example embodiments disclosed herein, a taillight signal recognition system is provided. An example embodiment can automatically detect taillight signals for all types of vehicles in real time and in all driving conditions. The example embodiment can use front-facing cameras mounted on the subject vehicle as input sensors. The example embodiments provide a method for automatically detecting taillight signals of a proximate leading vehicle, which includes receiving, at a computing device, a sequence of images from one or more cameras of a subject vehicle, generating a frame for each of the images, and labelling the images with one of three states of the taillight signals of proximate leading vehicles. The method further includes creating a first and a second dataset corresponding to the images and training a convolutional neural network to combine the first and the second dataset. The method also includes identifying a confidence level corresponding to statistics of temporal patterns of taillight signals, loading the confidence level to a calculating model, and refining parameters of the calculating model.

Referring again to FIG. 2, the diagram illustrates the components of the taillight signal recognition module 200 of an example embodiment. As described in more detail below, the deep convolutional neural network 173 and the taillight signal status determination module 175 serve to analyze one or more input images 210 received from one or more of the vehicle sensor subsystems 144, including one or more cameras, and determine the status of taillight signals corresponding to the images of proximate leading vehicles. The deep convolutional neural network 173 and the taillight signal status determination module 175 can be configured to provide object detection of the taillight area in an image input 210 received from one or more of the vehicle sensor subsystems 144, including one or more cameras. Alternatively, the deep convolutional neural network 173 and the taillight signal status determination module 175 can be configured to obtain a processed image from an image processing module and/or a detection and tracking module of a subsystem the vehicle 105. In an example embodiment, the modules 173 and 175 of the taillight signal recognition module 200 can receive the one or more input images 210 and produce taillight signal status information 220, as described in more detail below. The taillight signal status information 220 represents, for the image input 210, an output and visualization of the vehicle definitions for each proximate leading vehicle as determined by the object detection analysis of the image input 210. Additionally, the taillight signal status information 220 represents an output and visualization of the taillight signal status for each proximate leading vehicle based on the processing operations performed by the taillight signal recognition module 200. As such, the taillight signal status information 220 includes a current status of the detected taillight signals for each instance of each leading vehicle object detected in the one or more input images 210. The pixel-level taillight mask and instance-wise vehicle taillight status recognition enables the taillight signal recognition module 200 to determine the taillight status for each proximate leading vehicle, thereby enabling the vehicle control subsystem to determine the intent of drivers in proximate leading vehicles. As a result, the autonomous control subsystem of the vehicle control subsystem 146 can more efficiently and safely control the vehicle 105. As part of their image processing and taillight status detection, the deep convolutional neural network 173 and the taillight signal status determination module 175 can be configured to work with taillight signal analysis parameters 174, which can be used to customize and fine tune the operation of the taillight signal recognition module 200. The taillight signal analysis parameters 174 can be stored in a memory 172 of the in-vehicle control system 150.

Figure 3:
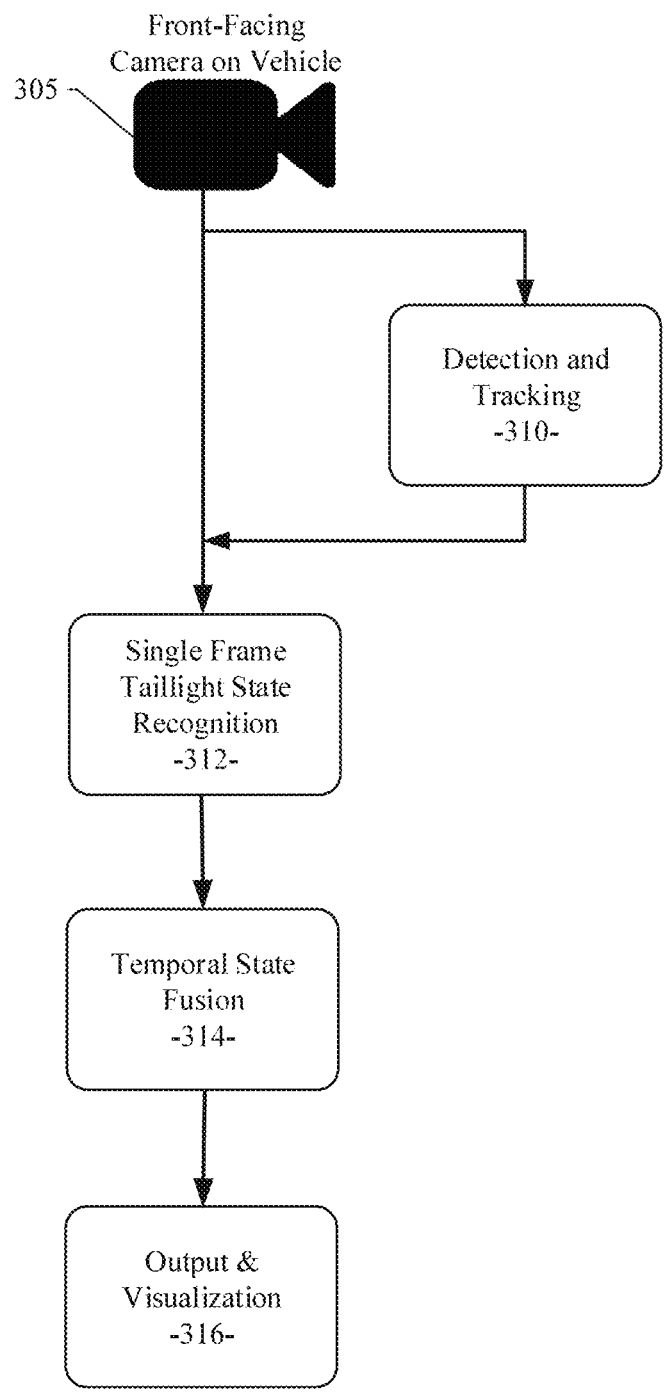
FIG. 3 is a basic flow diagram illustrating an example embodiment of a system and method for detecting taillight signals of a vehicle.
Figure 4:
FIGS. 4 through 6 illustrate an example of the processing performed by the taillight signal recognition module of an example embodiment.
Figure 5:
Figure 6:

Referring now to FIG. 3, a basic flow diagram illustrates an example embodiment of the system and method for detecting taillight signals of a vehicle as disclosed herein. The basic operational flow as shown in FIG. 3 is described below in combination with the sample images shown in FIGS. 4 through 6. FIGS. 4 through 6 illustrate an example of the processing performed by the taillight signal recognition module 200 of an example embodiment. FIG. 4 illustrates a sample raw input image received as image input 210. FIG. 5 illustrates an example of an object detection framework that uses bounding boxes to define the detection of an object in the image input 210. In the example shown in FIG. 5, the instances of vehicle objects detected in the raw image input 210 are each framed with bounding boxes and given a unique identifier (ID). FIG. 6 illustrates an example of the result of the processing performed by the taillight signal recognition module 200 of an example embodiment, wherein a taillight signal has been recognized from one of the proximate leading vehicle objects detected in the raw image input 210. As part of the taillight signal status information 220 produced by the taillight signal recognition module 200, an output and visualization of the taillight signal status recognized for the proximate leading vehicle is produced as shown for the vehicle identified as #2 in the example of FIG. 6.

Referring again to FIG. 3 with reference to the example of FIGS. 4 through 6 described above, a basic flow diagram illustrates an example embodiment of the system and method for detecting taillight signals of a vehicle. In an example embodiment, the taillight recognition system 201 of an example embodiment uses the images produced by one or more front-facing cameras 305 as an input. In the example embodiment, the taillight signal recognition module 200 can perform the object detection process and application of the bounding boxes to define the detection of objects in the image input 210. In an alternative embodiment, the taillight signal recognition module 200 can utilize the outputs produced by the detection and the tracking modules already provided in other vehicle subsystems. Essentially, the taillight signal recognition module 200 can produce or receive the bounding boxes of all proximate leading vehicles detected in every raw image input 210 frame from a detection module. The taillight signal recognition module 200 can also determine an association of the bounding boxes across multiple frames in temporal succession (e.g., in a time-dependent sequence) and thereby track the same detected vehicles over time using a tracking module. The tracking module can track the same detected vehicles over time (and over multiple image frames) by assigning unique IDs to the bounding boxes of each vehicle instance. This detection and tracking operation 310, as shown in FIG. 3, is an initial operation performed on the input images 210 by the taillight signal recognition module 200.

In an example embodiment, a first step of taillight signal recognition is single-frame taillight state classification as shown in operation block 312 of FIG. 3. For each vehicle detected in each image frame, a neural network classifier can be applied to the image patches or portions corresponding to the detected vehicles by use of the deep convolutional neural network 173. The neural network classifier can output two classification results for each detected vehicle regarding the left and right parts of the taillight image portions, respectively. In an example embodiment, there are three possible taillight status conditions for each of the two classification results: (1) the left/right parts of the taillights are invisible (which could mean the taillights are occluded by other objects or simply out of sight); (2) the left/right parts of the taillights are visible, but not illuminated; and (3) the left/right parts of the taillights are visible and illuminated. In an example embodiment, we use a specific architecture of a convolutional neural network (CNN) called ResNet-18 for parts of the deep convolutional neural network 173. The training of this neural network classifier is further described below. It will be apparent to those of ordinary skill in the art in view of the disclosure herein that other neural network architectures can similarly be used.

In the example embodiment, a second step of taillight signal recognition is temporal state fusion as shown in operation block 314 of FIG. 3. In this operational step, we keep a long history of previous single-frame taillight status condition classification results for each vehicle from the neural network classifier as described above. The retained history represents multiple image frames in temporal succession for each vehicle over a pre-configured or variable time period. The taillight signal recognition module 200 can use a noise-resistant statistical inference method to distinguish a brake light signal, a turn signal, and an emergency stop signal from the retained history of image frames. The taillight signal recognition module 200 can collect statistics of the temporal patterns detected in the history of previous single-frame taillight status condition classification results. Over time, a collection of templates of the temporal state of the taillight images can be generated. The previous single-frame images can be matched to the collection of templates to determine the status of the taillight signals for a particular vehicle. Once the status of the taillight signals for a particular vehicle is determined, the taillight signal status information 220 with corresponding outputs and visualizations can be generated as shown in operation block 316 of FIG. 3. As described above, the taillight signal status information 220 represents, for the image input 210, an output and visualization of the pixel-level vehicle definitions for each proximate leading vehicle and an output and visualization of the taillight signal status for each proximate leading vehicle based on the processing operations performed by the taillight signal recognition module 200.

Regarding turn signal recognition specifically, the taillight signal recognition module 200 can use two different inference outputs in an example embodiment: one inference output is configured to respond faster (e.g., 100 milliseconds delay) but with a less certain result; the other inference output is configured to respond more slowly (e.g., a 1 second delay) but with a more confident or more accurate result. It will be apparent to those of ordinary skill in the art in view of the disclosure herein that other implementations can use a greater or lesser number of inference outputs. When accelerated by a graphics processing unit (GPU), the taillight recognition system of the example embodiment can run at 80 Hz, exceeding the speed requirement for real-time processing.

Referring again to FIGS. 4 through 6, an example embodiment receives an image input 210. FIG. 4 illustrates a sample raw input image received as image input 210. In an example embodiment and given the raw image input 210, the deep convolutional neural network 173 of the taillight signal recognition module 200 can use a deep convolutional neural network (CNN) to serve as a feature extraction module. FIG. 5 illustrates the result of applying an object detection process to the raw image input 210 to produce a feature map. The instances of vehicle objects detected in the raw image input 210 are each framed with bounding boxes and given a unique identifier (ID). The taillight signal status determination module 175 of the taillight signal recognition module 200 can then apply a taillight recognition operation to recognize taillight signal status of the object instances detected in the image input 210. FIG. 6 illustrates an example of the result of the processing performed by the taillight signal recognition module 200 of an example embodiment, wherein a taillight signal has been recognized from one of the proximate leading vehicle objects detected in the raw image input 210. As part of the taillight signal status information 220 produced by the taillight signal recognition module 200, an output and visualization of the taillight signal status recognized for the proximate leading vehicle is produced as shown for the vehicle identified as #2 in the example of FIG. 6. Thus, taillight signal recognition using a convolutional neural network is disclosed.

Figure 7:
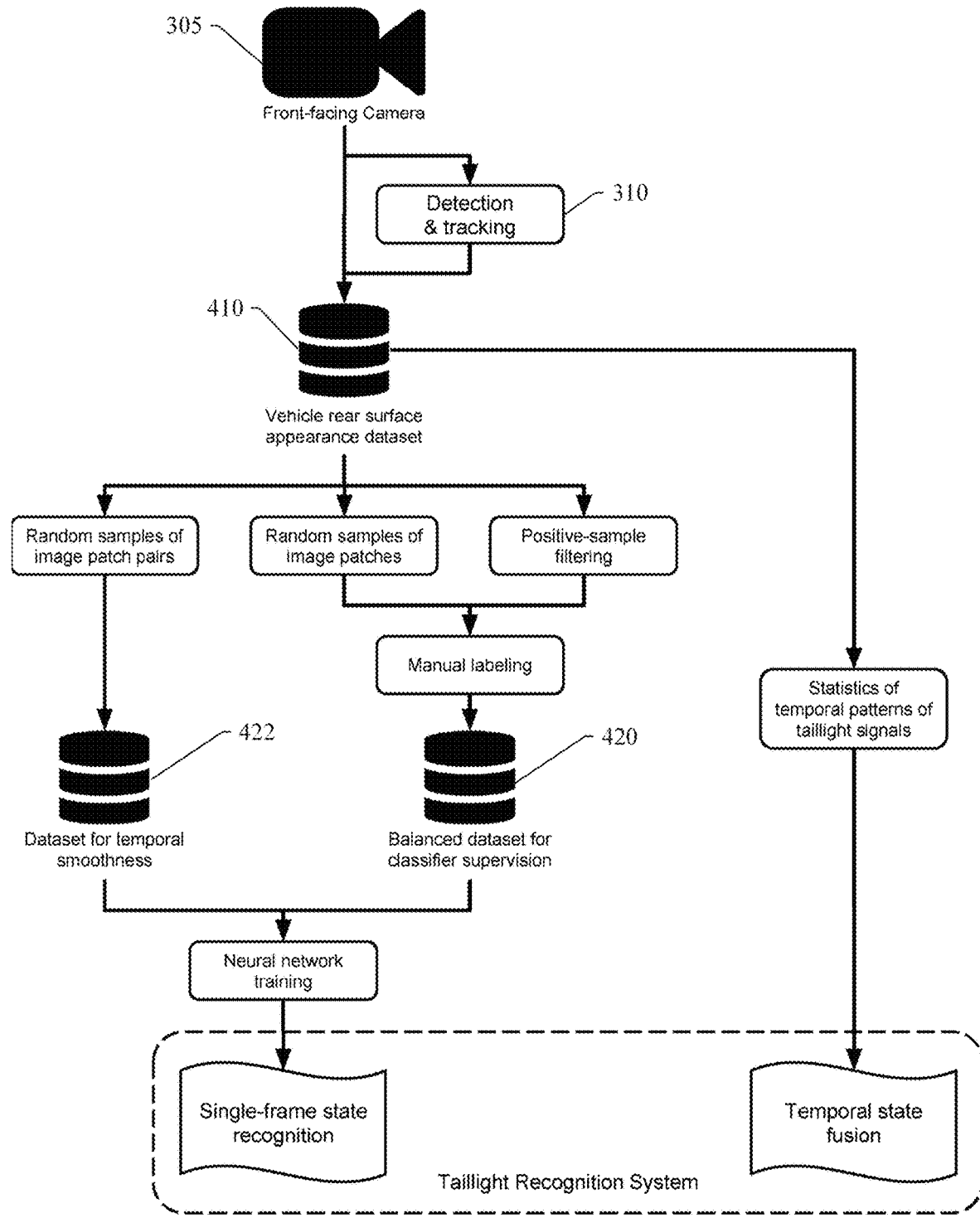
FIG. 7 is a detailed flow diagram illustrating an example embodiment of a system and method for detecting taillight signals of a vehicle.

Referring now to FIG. 7, a detailed flow diagram illustrates an example embodiment of a system and method for detecting taillight signals of a vehicle. As shown in FIG. 7, the taillight recognition system 201 of an example embodiment uses the images produced by one or more front-facing cameras 305 as an input. In the example embodiment, the taillight signal recognition module 200 can perform the object detection process and application of the bounding boxes to define the detection of objects in the image input 210. Alternatively, the taillight signal recognition module 200 can utilize the outputs produced by the detection and the tracking modules already provided in other vehicle subsystems. The taillight signal recognition module 200 can produce or receive the bounding boxes of all proximate leading vehicles detected in every raw image input 210 frame from a detection module. The taillight signal recognition module 200 can also determine an association of the bounding boxes across frames in temporal succession and thereby track the same detected vehicles over time using a tracking module. The tracking module can track the same detected vehicles over time (and over multiple image frames) by assigning unique IDs to the bounding boxes of each vehicle instance. This detection and tracking operation 310, as shown in FIG. 7, is an initial operation performed on the input images 210 by the taillight signal recognition module 200.

Referring still to FIG. 7 in an example embodiment, a first step of taillight signal recognition involves collecting a large dataset 410 of the images or image portions of vehicles' rear surfaces where taillights are typically installed. We collect many test images and many hours of test videos taken by front-facing cameras mounted on test vehicles. We ensure that a variety of roadway, weather, and lighting conditions are covered. We include a variety of different types of vehicles in the test images and videos. We also collect the outputs from the detection and the tracking modules described above, so that the taillight signal recognition module 200 can identify the rear surface appearances of each vehicle in many image frames. These test images and videos along with the outputs from the detection and the tracking modules can be used for training the deep convolutional neural network 173.

In an example embodiment, the training of the deep convolutional neural network 173 for single-frame taillight state classification can use two different training datasets. The process used in an example embodiment for building these two datasets is described next. The first type of dataset is a classifier supervision dataset 420 for classifier supervision. The classifier supervision dataset 420 contains pairs of image patches or portions of vehicle rear surfaces and their classifications. Each image patch or portion is classified, for the left and right portion of the taillight separately, as one of the three taillight status conditions: (1) the taillight is invisible, (2) the taillight is visible but not illuminated, and (3) the taillight is visible and illuminated. We use separate classifications for the left and the right portions of the taillight because that is very useful for detecting turn signals. In order to build the classifier supervision dataset 420, we first sample image patches or portions from the general dataset 410 collected in the first step as described above. In an example embodiment, the image patches can be presented to a human image labeler for manual labelling. Because taillight signals can be uncommon in normal traffic, we use two sampling methods to sample image patches or portions, so that the combined result has a balanced class distribution. The first sampling method uses a uniformly random sampling from all vehicle bounding boxes in all image or video frames, which yields only a few image patches or portions with illuminated taillights. The second sampling method uses positive-sample filtering, in which we use simple taillight detectors to collect patches or portions with illuminated taillights. The simple taillight detector is imperfect, but good enough for the sampling purpose. The results from the two sampling methods are combined, yielding an image patch or portion collection that has balanced class distribution. We can then present the image patches or portions to a human labeler for manual labelling. As a result, the classifier supervision dataset 420 can be generated from the converted and combined labelling results and used for neural network training.

Referring still to FIG. 7 in the example embodiment, a second type of dataset is a temporal smoothness dataset 422 collected to ensure the temporal smoothness of the resulting neural network classifier. The temporal smoothness dataset 422 is useful, because we observe that the neural network classifier would otherwise become overly sensitive to small changes in the image patch or portion inputs, yielding inconsistent prediction for a single vehicle within a fraction of a second. This is not desirable for the temporal fusion process used in the example embodiment and described above. The temporal smoothness dataset 422 consists of pairs of image patches or portions of the same vehicle's rear surface, taken 100 milliseconds apart from each other. The temporal smoothness dataset 422 does not contain classification results, and thus requires no manual labelling. We uniformly randomly sample such image patch or portion pairs from the general dataset 410 built in the first step, described above, to construct the temporal smoothness dataset 422.

After generating the classifier supervision dataset 420 and the temporal smoothness dataset 422 as described above, we can train the deep convolutional neural network 173 using a common architecture called ResNet-18. We load the parameters of the neural network 173 from a pre-trained model, and fine-tune the parameters to achieve an acceptable level of taillight signal recognition. We reduce the separate classification task of the left and right taillight into one task by exploiting the left-right symmetry of the classification task. Flipping left-right the image patch or portion would convert one classification task to the other, so we only need to train one classifier for both tasks. The training of the deep convolutional neural network 173 can be accomplished using the datasets 420 and 422 and the processes described above. After we have finished training the single-frame taillight state classifier as detailed above, we can collect some characteristic statistics for taillight temporal fusion. Among many statistics, an important statistic is one corresponding to the patterns of turn signals and emergency stop signals of various vehicles. We use those statistics to filter noisy predictions from the single-frame classifier, and make confident predictions by integrating temporal information in the temporal fusion process as described above.

The example embodiments can use the output produced by the vehicle detection and tracking module of an autonomous vehicle control system. The example embodiment can also run on the on-board computer equipped with a graphics processing unit (GPU). In the various embodiments described herein, the taillight signal recognition module 200 can produce taillight signal status information 220 representing the taillight states of all vehicles in sight up to 100 meters (328 feet) away at a frequency of over 80 Hz. Thus, taillight signal recognition using a convolutional neural network is disclosed.

Systems and Methods for Vehicle Taillight State Recognition

When driving on a roadway, the taillight illumination status of front or leading vehicles, as well as other proximate vehicles, is a strong visual sign indicating the likely behavior of the proximate vehicles at the current time or in the near future. For example, the taillight illumination status of proximate vehicles can indicate current or imminent behaviors, such as braking, turning, emergency response (flashing), or even reversing. After the taillight illumination status of a proximate vehicle is effectively recognized, more efficient and safer autonomous vehicle control actions and motion planning can be accomplished. Additionally, better trajectory prediction and speed estimation of other proximate vehicles and can be achieved. These efficiencies result in a safer, more reliable, and more robust autonomous vehicle driving system. As described in more detail below for example embodiments, a taillight signal recognition system is disclosed for use on or with autonomous vehicles or in driving environment simulation.

The taillight signal recognition system of the example embodiments can be implemented by generating datasets and machine learning models to recognize and act upon the taillight illumination status of proximate vehicles. In particular, an example embodiment can be implemented by: 1) creating a trajectory level fully human-annotated dataset for taillight state recognition; 2) creating a deep learning based feature extractor for taillight mask feature extraction; and 3) creating a machine learning based model for accurate trajectory level taillight state recognition. The creation and use of these datasets and machine learning models for example embodiments are described in more detail below.

Figure 8:
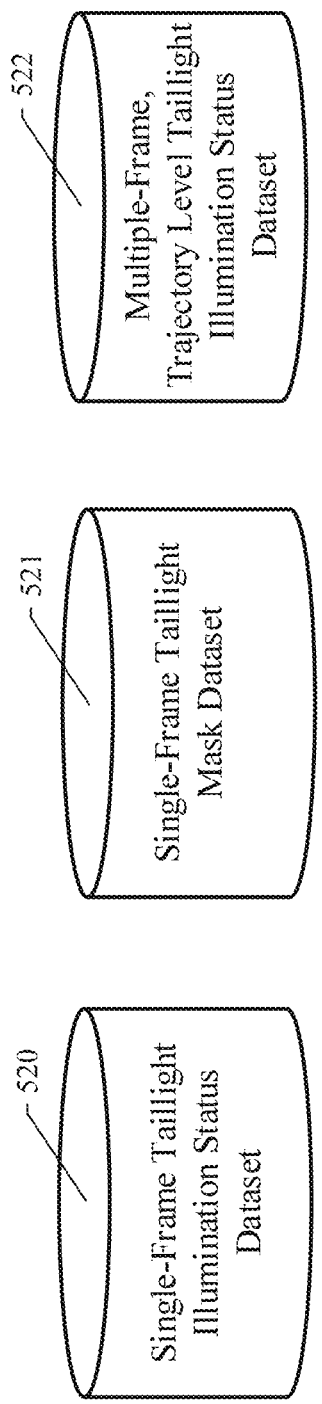
FIG. 8 illustrates the datasets used in an example embodiment of the taillight signal recognition system.

In an example embodiment, the taillight signal recognition system is configured to create three separate human-annotated datasets for the disclosed taillight recognition system. These datasets, as shown in FIG. 8, can include: 1) a single-frame taillight luminance or illumination status dataset 520, 2) a single-frame taillight mask dataset 521, and 3) a multi-frame, trajectory level taillight luminance or illumination status dataset 522. Each of these datasets are described in detail below.

Referring still to FIG. 8, the single-frame taillight luminance or illumination status dataset 520 can be generated in the same manner as classifier supervision dataset 420 described above. In particular, for each proximate vehicle, the taillight signal recognition system can be configured to annotate the illumination status of the taillights of each proximate vehicle for each single frame of the plurality of images (e.g., general dataset 410 described above) captured from the environment around the autonomous vehicle 105. The taillight illumination status of each proximate vehicle can include status indications, such as (1) the taillight is invisible or occluded, (2) the taillight is visible but not illuminated or dark, (3) the taillight is visible and illuminated or bright, and (4) the taillight status is unknown. The taillight illumination status of each proximate vehicle can also include inferred status indications, such as brake (e.g., the proximate vehicle is braking), right turn on (e.g., the proximate vehicle is signaling a right turn), left turn on (e.g., the proximate vehicle is signaling a left turn), hazard on (e.g., the proximate vehicle is signaling an emergency or hazard condition), etc. These illumination status indications and inferred status indications or annotations can be retained in dataset 520 for the left and right taillights of each proximate vehicle in each single image frame.

The datasets used in an example embodiment as shown in FIG. 8 can also include single-frame taillight mask dataset 521. Because the taillight illumination status of any particular vehicle only depends on the features within a predefined taillight region for each vehicle, the accurate acquisition of the taillight region for each vehicle is highly desired. This predefined taillight region for each vehicle can be isolated in a taillight mask annotation. In the example embodiment, the taillight signal recognition system is configured to annotate the left taillight region and right taillight region of each proximate vehicle using a mask annotation as shown by the example in FIG. 9.

Figure 9:
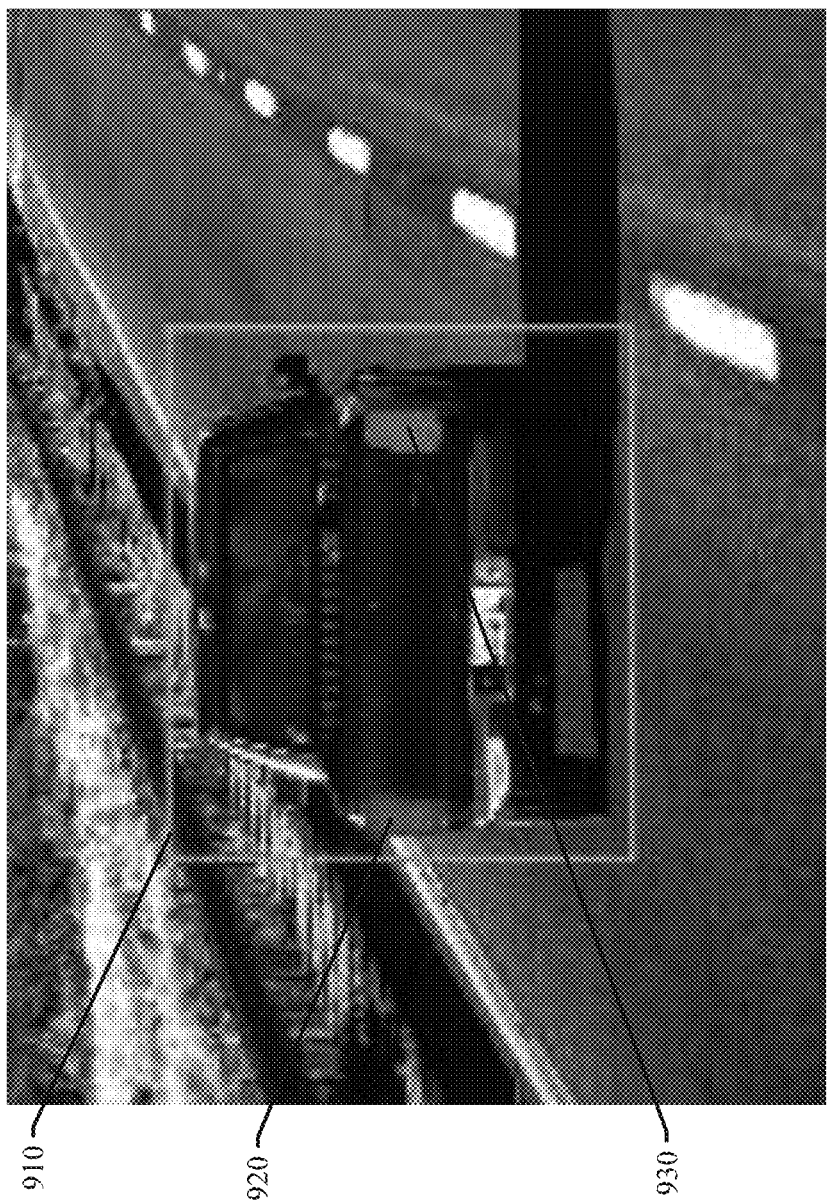
FIG. 9 illustrates an example of a taillight mask annotation for a particular proximate vehicle.

FIG. 9 illustrates an example of a taillight mask annotation for a particular proximate vehicle. The proximate vehicle in the example image of FIG. 9 is shown in a green rectangular bounding box 910. The left predefined taillight region 920 and the right predefined taillight region 930 are annotated with a green mask and a yellow mask, respectively. The predefined taillight region for other proximate vehicles in each single frame of the plurality of images from general dataset 410 can be similarly annotated with a single-frame taillight mask. The single-frame taillight mask annotations can be retained in dataset 521.

Referring again to FIG. 8, the datasets used in an example embodiment can include a multi-frame, trajectory level taillight luminance or illumination status dataset 522. Because the accurate taillight illumination state (e.g., braking, turning, flashing, etc.) is time-dependent, it is not sufficient to predict the taillight illumination state given only a single image frame. Therefore, the taillight signal recognition system disclosed herein is configured to take a series of image frames (multiple frames) of trajectory tracked proximate vehicles into consideration. The series of image frames of each proximate vehicle represents multiple image frames of the proximate vehicle in temporal succession. The taillight signal recognition system is configured to annotate the taillight illumination state for each of the proximate vehicles in each individual frame of a multiple image frame set in temporal succession. In a particular example embodiment, the multi-frame taillight illumination status annotations can be implemented as the data generated for the temporal smoothness dataset 422 described above. The generation and use of the multi-frame taillight illumination status annotations improves the accuracy of the predicted behavior of the proximate vehicles and improves autonomous vehicle control and motion planning. The multi-frame, trajectory level taillight luminance or illumination status annotations can be retained in dataset 522.

Once the datasets 520, 521, and 522 are created as described above, the taillight signal recognition system of an example embodiment is configured to perform three basic operations to recognize and act upon the taillight illumination status of proximate vehicles. These three basic operations in an example embodiment can include, 1) feature extraction, 2) feature aggregation, and 3) prediction. These operations can be performed by the taillight signal status determination module 175 of the taillight signal recognition system 201 as described above and configured in the manner described herein. Each of these operations are illustrated in FIG. 10 and described in detail below.

Feature Extraction

The single-frame taillight illumination status dataset 520 can be used with supervised signals to train the deep convolutional neural network 173 as shown in FIG. 2. The trained deep convolutional neural network 173 can then be used to process raw image input from cameras of an autonomous vehicle. This raw image input can be received as image input 210 as shown in FIG. 2. In an example embodiment and given the raw image input 210, the trained deep convolutional neural network 173 of the taillight signal recognition module 200 can serve as a feature extraction module by applying feature extraction and/or an object detection process to the raw image input 210 to produce a feature map. The instances of vehicle objects detected in the raw image input 210 are each framed with bounding boxes and given a unique identifier (ID). The taillight signal status determination module 175 and the trained deep convolutional neural network 173 of the taillight signal recognition module 200 can then apply a taillight signal status recognition operation to predict or recognize taillight signal status of the object instances detected in the image input 210. For example, the taillight signal status recognition operation, as shown in FIG. 9, includes a single-frame level recognition of left and right taillight illumination status and generation of the left and right taillight mask for a proximate vehicle identified in image input 210.

Figure 10:
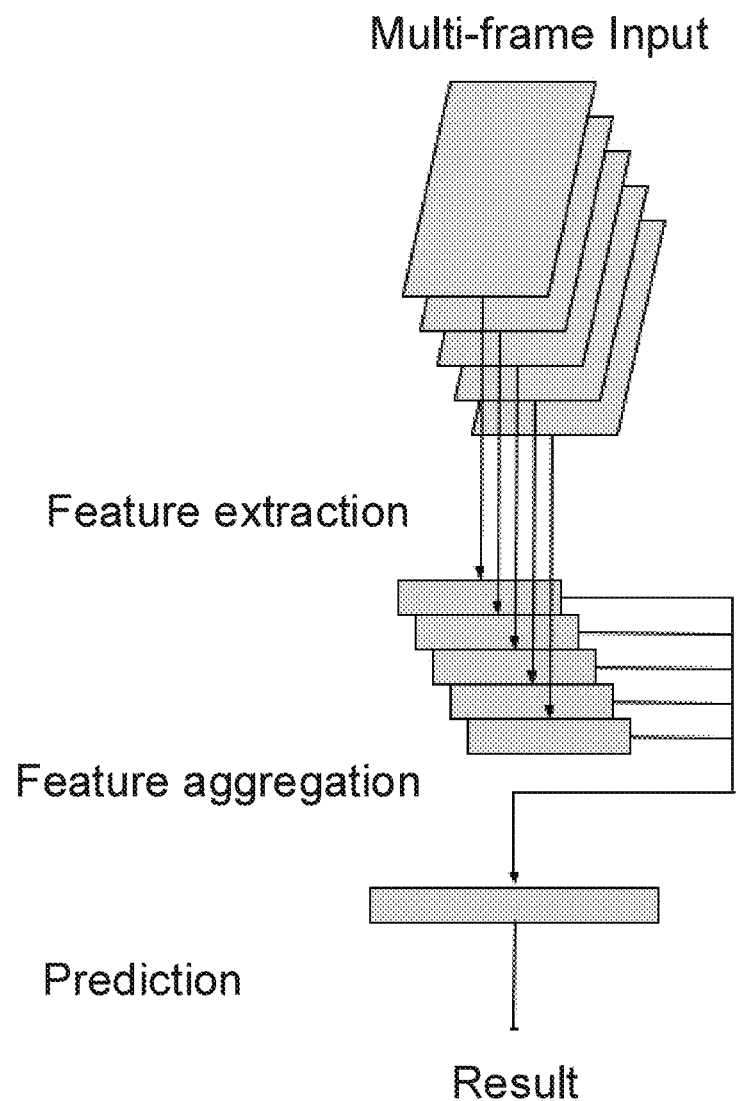
FIG. 10 illustrates the taillight signal recognition operations performed by the taillight signal recognition module of an example embodiment.

Referring to FIG. 10, the image frames of the image input 210 are received for feature extraction as described above. The taillight signal status determination module 175 and the trained deep convolutional neural network 173 of the taillight signal recognition module 200 can apply the taillight signal status recognition operation to extract features from single image frames and recognize taillight signal status of the object instances detected in the single image frames of the image input 210. The taillight signal status determination module 175 and the trained deep convolutional neural network 173 of the taillight signal recognition module 200 can also generate the left and right taillight mask for each proximate vehicle identified in the image input 210. After the taillight mask is generated, local feature extraction can also be performed on each side of the taillight mask to extract additional features, including but not limited to, color, histograms, local descriptors, motion, and flow.

Feature Aggregation

Having performed the single-frame image feature extraction as described above, it is also important to process multiple image frames in temporal succession to capture time-dependent temporal features among the extracted single-frame features. For this purpose, the taillight signal recognition system of the example embodiments applies a feature aggregation operation after the feature extraction operation as shown in FIG. 10. Feature aggregation enables the taillight signal recognition system to capture the variation of the taillight illumination state in the proximate vehicle trajectory over time and over a temporal succession of image frames. In an example embodiment, the taillight signal recognition system implements the feature aggregation operation by integrating each extracted feature and its corresponding feature value with its feature counterpart in each previous image frame within a predefined time window. The feature integration methods can include, but are not limited to, subtraction, addition, and learning based models (e.g., Hidden Markov Models—HMM, graphical models, etc.). Integrating all these feature values for the same extracted feature over multiple image frames in temporal succession yields the full representation of the extracted and aggregated features. The aggregated feature data can be retained in the multi-frame, trajectory level taillight luminance or illumination status dataset 522.

Prediction

As described above, the taillight signal status determination module 175 and the trained deep convolutional neural network 173 of the taillight signal recognition module 200 can generate aggregated feature data using the disclosed feature extraction operation and the feature aggregation operation. As a result, the aggregated feature data represents feature values for extracted features over multiple image frames in temporal succession. In particular, the aggregated feature data can represent the illumination state of taillights of proximate vehicles over a pre-defined time window. This aggregated feature data enables the taillight signal recognition module 200 to predict or recognize the illumination state of taillights of proximate vehicles near the autonomous vehicle 105 over the pre-defined time window and over a pre-defined number of image frames in temporal succession.

Figure 11:
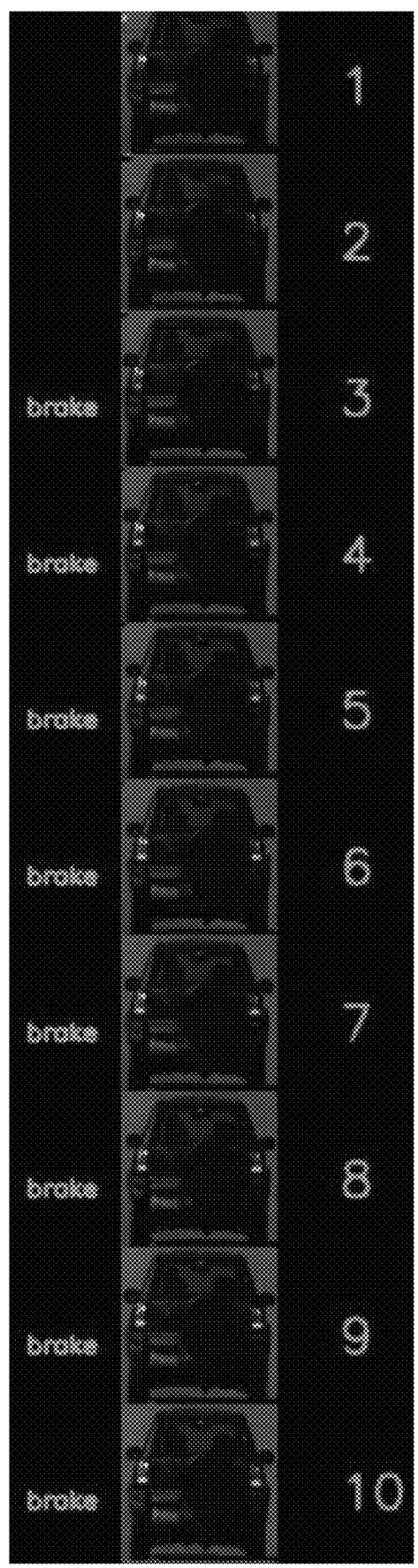
FIGS. 11 and 12 illustrate examples of multiple image frame sets in temporal succession and the predicted or recognized taillight illumination state for each image frame.

For example, FIG. 11 illustrates a multiple image frame set in temporal succession, with each image frame numbered 1 to 10. Each image frame of the set corresponds to an image of a rear portion of a proximate vehicle captured in the image input 210. As described above, the taillight signal recognition module 200 can use the taillight signal status determination module 175 and the trained deep convolutional neural network 173 to isolate the taillight portion of the rear image of the proximate vehicle with the single-frame taillight mask dataset 521. The taillight signal status determination module 175 and the trained deep convolutional neural network 173 can also use the single-frame taillight luminance or illumination status dataset 520 to determine the taillight illumination state of the vehicle taillights at a moment in time. Additionally, as described above, the taillight signal recognition module 200 can also aggregate the taillight feature data from each image over multiple image frames and over the pre-determined time window to produce a more accurate taillight illumination status prediction. As shown in FIG. 11, the multiple image frames of the tracked proximate vehicle in temporal succession are received by the taillight signal recognition module 200 and labeled with a frame identifier (1 to 10). For each image frame, the taillight signal recognition system can be configured to predict or recognize the taillight illumination state. For example in FIG. 11, the taillight illumination state for image frame 3 to image frame 10 is correctly predicted or recognized by the taillight signal recognition module 200 as "brake" (e.g., the proximate vehicle is braking). The recognized taillight illumination state for each proximate vehicle can be output by the taillight signal recognition system as taillight signal status information 220.

Figure 12:
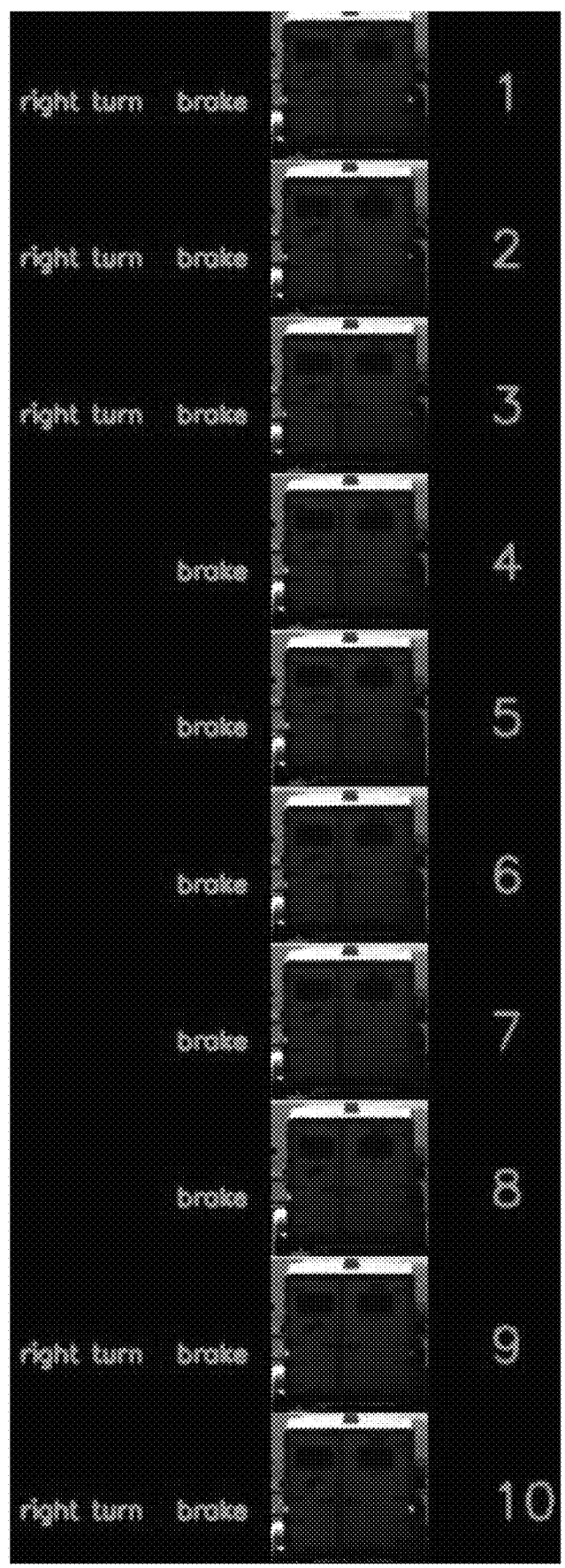

In another example shown in FIG. 12, the multiple image frames of the tracked proximate vehicle in temporal succession are received by the taillight signal recognition module 200 and labeled with a frame identifier (1 to 10). For each image frame, the taillight signal recognition system can be configured to predict or recognize the taillight illumination state. For example in FIG. 12, the taillight illumination state for image frames 1 to 10 is correctly predicted or recognized by the taillight signal recognition module 200 as "brake" (e.g., the proximate vehicle is braking). Additionally, the taillight illumination state for image frames 1 to 3 and 9 to 10 is correctly predicted or recognized by the taillight signal recognition module 200 as "right turn" (e.g., the proximate vehicle is signaling a right turn). Again, the recognized taillight illumination state for each proximate vehicle can be output by the taillight signal recognition system as taillight signal status information 220.

Once the taillight signal recognition system has produced the taillight signal status information 220 as described above, the vehicle subsystems 140 can use the taillight signal status information 220 to modify the control actions, the trajectory, and/or the route planning for the autonomous vehicle 105 accordingly. For example, if the taillight signal recognition system determines that a proximate or leading vehicle is braking based on the illumination state of the leading vehicle's taillights, the vehicle subsystems 140 of the autonomous vehicle 105 can be commanded to slow or brake the autonomous vehicle 105 in corresponding fashion. For another example, if the taillight signal recognition system determines that a proximate or leading vehicle is signaling a right or left turn, based on the illumination state of the leading vehicle's taillights, the vehicle subsystems 140 of the autonomous vehicle 105 can be commanded to modify the trajectory and/or speed of the autonomous vehicle 105 in corresponding fashion. Thus, the taillight signal status information 220 produced by the taillight signal recognition system as described above can be used to modify the control signals and route planning for an autonomous vehicle.

Figure 13:
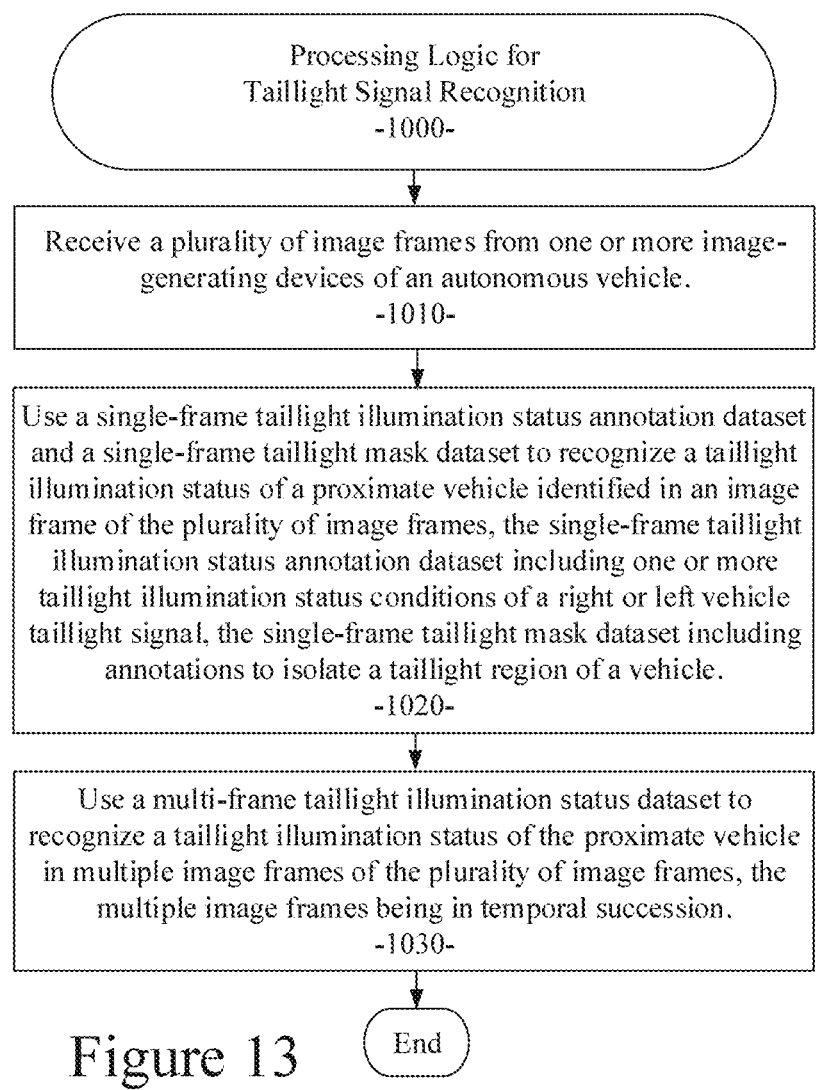
FIG. 13 is a process flow diagram illustrating an example embodiment of a system and method for detecting taillight signals of a vehicle.

Referring now to FIG. 13, a flow diagram illustrates an example embodiment of a system and method 1000 for taillight signal recognition. The example embodiment can be configured for: receiving a plurality of image frames from one or more image-generating devices of an autonomous vehicle (processing block 1010); using a single-frame taillight illumination status annotation dataset and a single-frame taillight mask dataset to recognize a taillight illumination status of a proximate vehicle identified in an image frame of the plurality of image frames, the single-frame taillight illumination status annotation dataset including one or more taillight illumination status conditions of a right or left vehicle taillight signal, the single-frame taillight mask dataset including annotations to isolate a taillight region of a vehicle (processing block 1020); and using a multi-frame taillight illumination status dataset to recognize a taillight illumination status of the proximate vehicle in multiple image frames of the plurality of image frames, the multiple image frames being in temporal succession (processing block 1030).

As used herein and unless specified otherwise, the term "mobile device" includes any computing or communications device that can communicate with the in-vehicle control system 150, the taillight signal recognition module 200, and/or the taillight signal recognition module 200 as described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150, the taillight signal recognition module 200, and/or the taillight signal recognition module 200 as described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150, the taillight signal recognition module 200, and/or the taillight signal recognition module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150, the taillight signal recognition module 200, and/or the taillight signal recognition module 200 can be implemented using systems that enhance the security of the execution environment, thereby improving security and reducing the possibility that the in-vehicle control system 150, the taillight signal recognition module 200, and/or the taillight signal recognition module 200 and the related services could be compromised by viruses or malware. For example, the in-vehicle control system 150, the taillight signal recognition module 200, and/or the taillight signal recognition module 200 can be implemented using a Trusted Execution Environment, which can ensure that sensitive data is stored, processed, and communicated in a secure way.

Figure 14:
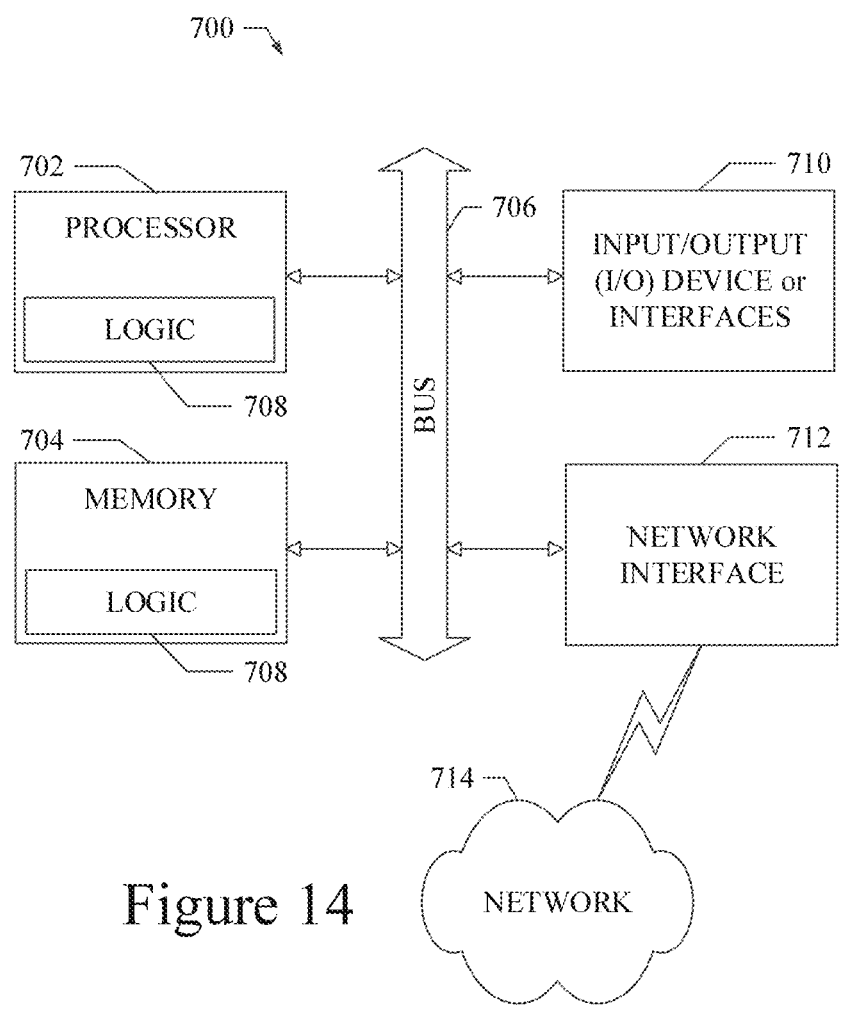
FIG. 14 shows a diagrammatic representation of machine in the example form of a computer system within which a set of instructions when executed may cause the machine to perform any one or more of the methodologies discussed herein.

FIG. 14 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth©, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A taillight signal recognition apparatus comprising:
   a test image collector configured to collect test images and test videos captured by cameras mounted on test vehicles or installed at test locations;
   an image annotator configured to annotate the captured images and videos for vehicle taillight recognition;
   a deep learning based feature extractor configured for taillight feature extraction from the annotated images; and
   a machine learning based model configured for trajectory level taillight state recognition and for inferring a predicted behavior of a vehicle based on the trajectory level taillight state recognition.

2. The apparatus of claim 1 wherein the taillight state recognition is based on a taillight status indication comprising at least one of: a brake light signal, a left turn signal, a right turn signal, and a hazard light signal.

3. The apparatus of claim 1 wherein the inferred predicted behavior of a vehicle comprises at least one of: a braking or slowing action, a left turn, and a right turn.

4. The apparatus of claim 1 wherein the test images and test videos are captured in a variety of different weather conditions, roadway conditions, and lighting conditions.

5. The apparatus of claim 1 including a classifier supervision dataset containing pairs of image patches or portions of vehicle rear surfaces and their classifications.

6. The apparatus of claim 5 wherein the machine learning based model is trained using the classifier supervision dataset.

7. The apparatus of claim 1 including a temporal smoothness dataset containing pairs of image patches or portions of a same vehicle rear surfaces taken at multiple time increments.

8. The apparatus of claim 7 wherein the machine learning based model is trained using the temporal smoothness dataset.

9. The apparatus of claim 1 wherein the taillight state recognition is based on a taillight status indication from the group consisting of: the taillight is invisible or occluded, the taillight is visible but not illuminated or dark, the taillight is visible and illuminated or bright, and the taillight status is unknown.

10. A method comprising:
    collecting test images and test videos captured by cameras mounted on test vehicles or installed at test locations;
    annotating the captured images and videos for vehicle taillight recognition;
    creating a deep learning based feature extractor for taillight feature extraction from the annotated images; and
    creating a machine learning based model for taillight state recognition and for inferring a predicted behavior of a vehicle based on the taillight state recognition.

11. The method of claim 10 wherein the taillight state recognition is based on a taillight status indication comprising at least one of: a brake light signal, a left turn signal, and a right turn signal.

12. The method of claim 10 wherein the inferred predicted behavior of a vehicle comprises at least one of: a left turn and a right turn.

13. The method of claim 10 wherein the test images and test videos are captured in a variety of different weather conditions and lighting conditions.

14. The method of claim 10 including a classifier supervision dataset containing pairs of image patches or portions of vehicle rear surfaces and their classifications.

15. The method of claim 10 including a temporal smoothness dataset containing pairs of image patches or portions of a same vehicle rear surfaces taken at multiple time increments.

16. The method of claim 10 wherein human labelers are used to annotate the captured images.

17. The method of claim 10 wherein the machine learning based model is trained using a combination of a classifier supervision dataset and a temporal smoothness dataset.

18. The method of claim 10 wherein the taillight state recognition is based on a taillight status indication from the group consisting of: the taillight is invisible or occluded, the taillight is visible but not illuminated or dark, the taillight is visible and illuminated or bright, and the taillight status is unknown.

19. A non-transitory computer-readable medium storing instructions which, when executed by at least one processor, cause the at least one processor to:
    collect test images and test videos captured by cameras mounted on test vehicles or installed at test locations;
    annotate the captured images and videos for vehicle taillight recognition;
    create a deep learning based feature extractor for taillight feature extraction from the annotated images; and
    create a machine learning based model for taillight state recognition and for inferring a predicted behavior of a vehicle based on the taillight state recognition.

20. The non-transitory computer-readable medium of claim 19 wherein the taillight state recognition is based on a taillight status indication comprising at least one of: a brake light signal, a left turn signal, a right turn signal, and a hazard light signal.

* * * * *